(12) United States Patent
Fisher

(10) Patent No.: US 6,876,953 B1
(45) Date of Patent: Apr. 5, 2005

(54) NARROWBAND SIGNAL PROCESSOR

(75) Inventor: Scott D. Fisher, Middletown, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/553,510

(22) Filed: Apr. 20, 2000

(51) Int. Cl.[7] .............................. G06F 15/00; G01L 7/02
(52) U.S. Cl. ........................ 702/189; 341/50; 375/142; 704/207; 704/208; 704/251
(58) Field of Search .......................... 702/73, 76, 189, 702/190, 191, 194, 196; 341/50; 333/32; 379/398; 704/208, 251, 207; 375/142

(56) References Cited

U.S. PATENT DOCUMENTS

| | | | | | |
|---|---|---|---|---|---|
| 5,003,602 A | * | 3/1991 | Koyama | ...................... | 704/251 |
| 5,774,837 A | * | 6/1998 | Yeldener et al. | ............. | 704/208 |
| 5,787,387 A | * | 7/1998 | Aguilar | ....................... | 704/208 |
| 5,890,108 A | * | 3/1999 | Yeldener | ..................... | 704/208 |
| 5,995,027 A | * | 11/1999 | Henry | .......................... | 341/50 |
| 5,999,561 A | * | 12/1999 | Naden et al. | ................ | 375/142 |
| 6,199,037 B1 | * | 3/2001 | Hardwick | .................... | 704/208 |
| 6,233,549 B1 | * | 5/2001 | Mauro et al. | ................ | 704/207 |

* cited by examiner

Primary Examiner—John Barlow
Assistant Examiner—John Le
(74) Attorney, Agent, or Firm—James M. Kasischke; Michael F. Oglo; Jean-Paul A. Nasser

(57) ABSTRACT

A method to process narrowband signals includes dividing the signal into segments of length N, where N optimizes filter bandwidth, FFT size, processing and memory. Each N-length segment is processed sequentially by filtering, a FFT and a peak detector that identifies the N-length segment's K largest spectral components. The frequency, bandwidth and power for the K largest spectral components are stored sequentially as N-processed data. After processing multiple N-length segments, reconstructing individual frequency spectrums for J continuous segments of the N-processed data, mapping the J reconstructed spectrums to a single spectrum, and applying the peak detector to the composite spectrum to separately store the single spectrum's K largest frequencies, with powers and bandwidths, as (N×J)-processed data. The N-length data is processed in groups of J until all N-length data is reprocessed. J may have multiple values, generating multiple processed data sets.

11 Claims, 3 Drawing Sheets

NARROWBAND SIGNAL PROCESSOR

STATEMENT OF GOVERNMENT INTEREST

The invention described herein may be manufactured and used by of for the Government of the United States of America for governmental purposes without the payment of any royalties thereon or therefore.

BACKGROUND OF THE INVENTION (1) Field of the Invention

The present invention relates to processing narrowband signal components, and more specifically to an efficient method for achieving a variable processing interval with a fixed Fast Fourier Transform (FFT) size and filter bandwidth.

(2) Description of the Prior Art

The FFT is an integral component of modern, digital signal processing because of the efficiency it provides in computing the Discrete Fourier Transform (DFT) of a given signal. Although FFT algorithms vary, the fundamental component of all FFT processing is the signal decomposition into successively smaller DFTs. These smaller DFTs exploit the cosine and sine function symmetry and periodicity to reduce the overall multiplications and additions, thereby allowing a transformation, i.e. a DFT, using relatively few computations.

Narrowband signals are characterized by a large power spectrum component, i.e., a peak as compared to the surrounding spectrum that occupies a narrow frequency window. Narrowband signals represent periodic or near-periodic time-domain signals. Because periodic signals typically occur over large time periods when compared to processing intervals, it is difficult to determine the correct processing interval to allow narrowband detection in the frequency domain. Processing intervals are further limited by computational constraints including processor speed, memory, filter design, and FFT size.

Conventional automated techniques exist for tracking narrowband signals using frequency domain features, while another approach allows narrowband tracking by time-domain signal processing. The existing automated tracking techniques are designed for processing limitations including filter bandwidth and sampling size; however, narrowband signal information is utilized beyond tracking purposes. There is currently not an efficient method for generating general narrowband signal information that effectively varies the processing interval while meeting system constraints including filter bandwidth and FFT size. What is needed is a system that generates narrowband information while effectively varying the processing interval, without imposing additional requirements on processor speed, FFT size, filter bandwidth and memory.

SUMMARY OF THE INVENTION

It is the general purpose and object of the present invention to provide a method to generate narrowband signal information.

It is a further object to generate such narrowband information using a fixed filter bandwidth and FFT size, but allowing the processing interval to effectively increase variably by post-processing longer, continuous samples of fixed-length data, without requiring increased filter bandwidths or additional FFT processing.

Still another object is to provide the processing interval variability in a computationally and memory efficient manner.

These objects are accomplished with the present invention by providing a method that processes information from continuous input signal segments of length N, where N is the fixed processing interval that shall become the basis for all larger processing intervals. The N-length segments are processed sequentially and identically, being input to a filter, a FFT and a peak detector that identifies and stores the segment's K largest frequencies with their associated bandwidths and powers, before processing the next N-length segment. After sufficient segments are processed and associated information is stored as N-processed data, effective processing interval variability and computational efficiency is achieved by individually reconstructing frequency spectrums, using the N-processed data, for J consecutive intervals of length N, mapping the J consecutive reconstructed spectrums to a single spectrum, applying the peak detector to the composite spectrum, and storing the K largest frequencies with respective powers and bandwidths as (N×J)-processed data. The (N×J)-processed data is continually processed and stored sequentially, separate from the N-processed data. J may have a single or multiple values, and in the case of multiple J values, multiple (N×J)-processed data memory segments are required, with all (N×J)-processed data derived from the N-processed data.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
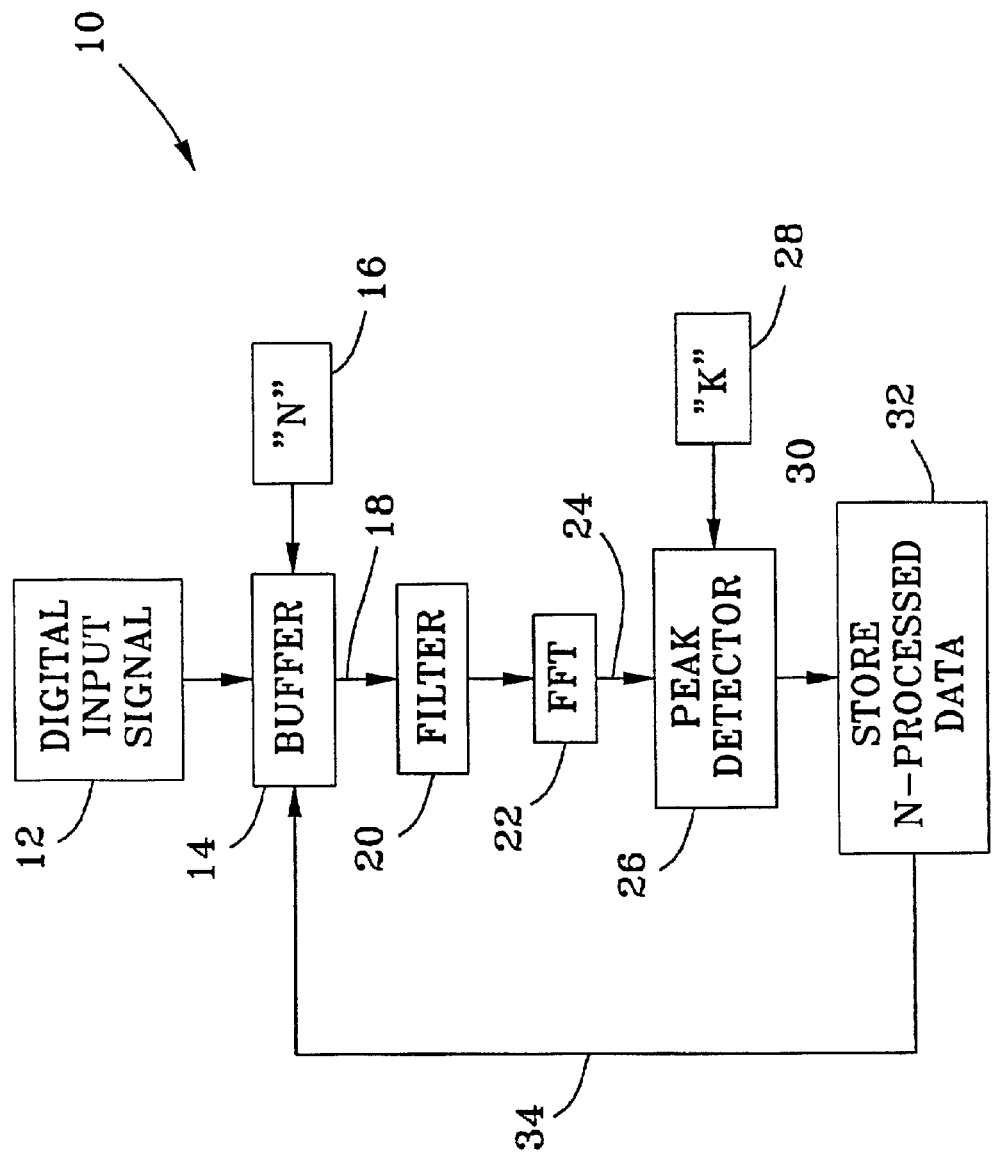
FIG. 1 is a diagram of the method used to obtain the N-processed data from which all other longer processing intervals are derived.

Referring now to FIG. 1 there is shown the method 10 required to obtain "N-processed data" from a digital input signal 12. The signal 12 is buffered at 14 to provide time-sequential, continuous signal segments 18 of length N. Each digitized N-length signal segment 18 is filtered 20 using user-defined and user-specified filtering techniques, and is passed through a FFT 22 to compute the DFT 24 for the N-length signal segment 18. FFT algorithms are well known and the FFT algorithm or device selection does not affect the invention herein. The DFT 24 spectral components are applied to a peak detector to compute a power spectral density at 26. The output 30 comprises the K largest spectral components' respective frequencies, powers, and bandwidths, for the N-length signal segment's DFT 24. The K largest DFT frequencies, powers, and bandwidths 30 for the N-length segment are stored 32 to a memory segment designated N-processed data memory. Storing 32 further includes correlating the N-length signal segment 18 with its respective input signal time. Once the K largest frequencies, powers, and bandwidths 30 are stored 32 in N-processed data memory, the method 10 returns 34 to process the next time-sequential N-length segment 18.

It will be noted that the buffering 14 may be accomplished by any device or technique capable of buffering and segmenting data. The value N may be stored internally to the buffering device or in an external location 16 accessible by the buffer. The value "N" specifies the sample size or time interval that represents the base processing interval. N is predetermined, user-specified, and selected from system characteristics including the filtering 20 bandwidth, FFT 22 size, desired resolution, etc. N should also be selected with the knowledge that the results from the base interval processing are stored 32 in memory as N-processed data, and all increased processing interval data are derived from the N-processed data.

Similar to "N", the value K may be stored internally or externally (shown at 28) to the peak detector so as to be accessible to the peak detector to compute the power spectral density at 26. The value K varies by application and determines the signal segment's frequency memory content. K is also user-specified and should provide the desired frequency resolution, allow proper characterization of the frequency content, and generate sufficient information for frequency spectrum reconstruction, as explained in FIG. 2.

Because the peak detector outputs 30 are the K largest spectral components for the signal segment being processed, peak detecting step 26 therefore comprises the ability to compute a power spectrum from the DFT 24, and analyze the power spectrum to determine the largest K components. Peak detectors capable of performing this operation are well known and any such detector compatible with the DFT output 24 can be used.

When the total signal 12, i.e., each N-length segment 18, is processed according to the method 10 of FIG. 1, N-processed data memory as stored at 32 consists of a memory block with M segments, where M equals the total digitized input signal length divided by N. Each of the M memory segments further comprises K frequencies, powers, and bandwidths; and the M memory segments are stored at 32 to correlate each of the M memory segments with a respective input signal time. The relationship of memory contents to input signal time must allow for later grouping of frequency data information from continuous time segments.

Figure 2:
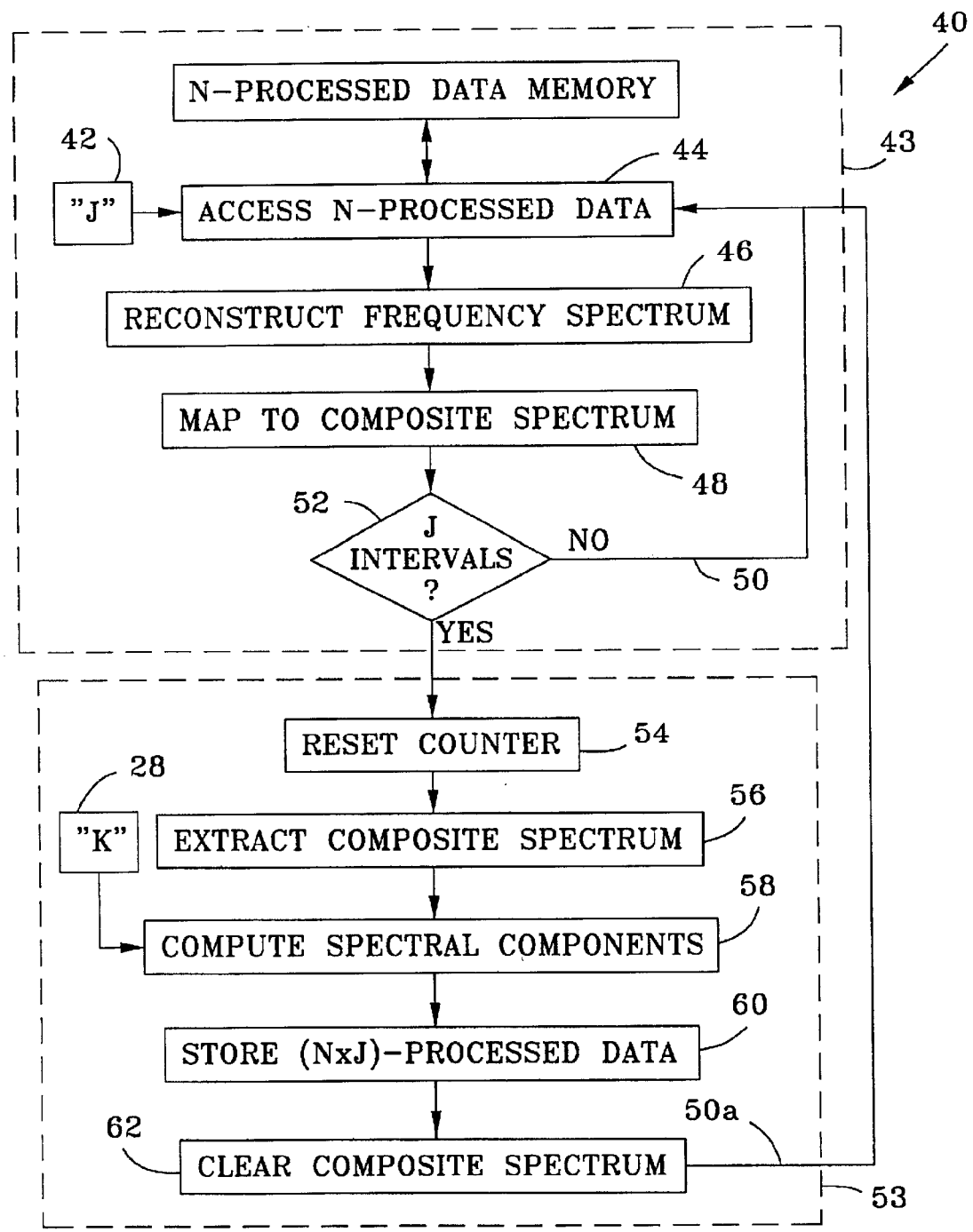
FIG. 2 is a diagram of the method used to increase the effective processing interval and create (N×J)-processed data.

FIG. 2 shows the method 40 to effectively expand the processing interval as a multiple of N, the processing interval of FIG. 1. The multiplier J, stored at 42, is variable, user-specified, permissibly multiple-valued, and expands the processing interval from length N, to length (N×J). Beginning at the desired point of interest in the input signal, as stored or mapped to N-processed memory at step 32 of FIG. 1, the N-processed data is sequentially accessed (44) J times as shown by loop method segment 43. Each of the J extractions are sequential in that the current extraction from memory corresponds to the input signal time period immediately following the previous extraction from memory.

The FIG. 2 loop method segment 43 indicates the processing performed for each of the J extractions. Each of the J extractions comprises the K frequencies, powers and bandwidths from the N-processed data memory as previously noted. From these K frequencies, powers and bandwidths, a frequency spectrum is reconstructed 46 for each of the J, N-length intervals. The reconstructed frequency spectrum for each N-length interval is then mapped to a composite spectrum 48. The composite spectrum contains all reconstructed spectral information for the current grouping of J intervals. The loop segment 43 tests if J intervals in this grouping have been processed 52. If not, loop segment 43 returns (50) to access the next N-length interval at 44, Once J intervals are processed according to 43, the composite spectrum is processed as shown by segment 53.

The counter for J is first reset at 54 and the composite spectrum for J intervals mapped at 48 is then extracted at 56. In a manner similar to the method of FIG. 1, the composite spectrum is applied to a peak detector to compute a power spectral density at 58 to provide the K largest spectral components' respective frequencies, powers, and bandwidths, for the J intervals of length N, which are stored 60 as (N×J)-processed data memory for this (N×J) length interval. As described for FIG. 1, "K" may be stored internal to the peak detector or stored externally at 28. The composite spectrum is then cleared at 62 for the next (N×J) length interval processing and the method segment 53 returns to loop segment 43 as shown by path 50a to continue processing the next J intervals of length N.

As with the N-processed data memory, the storage of the (N×J)-processed data memory at 60 includes correlating the processed (N×J) interval with its corresponding input signal time period. It is noted that the (N×J)-processed data memory is distinct from the N-processed data memory. Additionally, if the value of J is changed, there is a distinct (N×J)-processed memory segment for each value of J. The processing result is multiple memory segments, with one segment containing the N-processed data, and additional memory segments containing (N×J)-processed data, with one memory segment for each distinct value of J.

Considering an example whereby the input signal length is a total of M×N seconds and it is processed in N-length intervals to create M segments of N-processed data, the FIG. 2 method of recreating and accumulating J spectrums to comprise a composite spectrum, results in M/J composite spectrums. The (N×J)-processed data memory therefore contains only (M/J)*K frequencies, powers, and bandwidths. Therefore, depending on the value of J, the (N×J)-processed data can require significantly less memory than the N-processed data. The processing time to obtain the (N×J)-processed data is additionally significantly reduced when compared to the N-processed data, because the filtering 20 and FFT 22 (FIG. 1) are not required to obtain the (N×J)-processed data.

Figure 3:
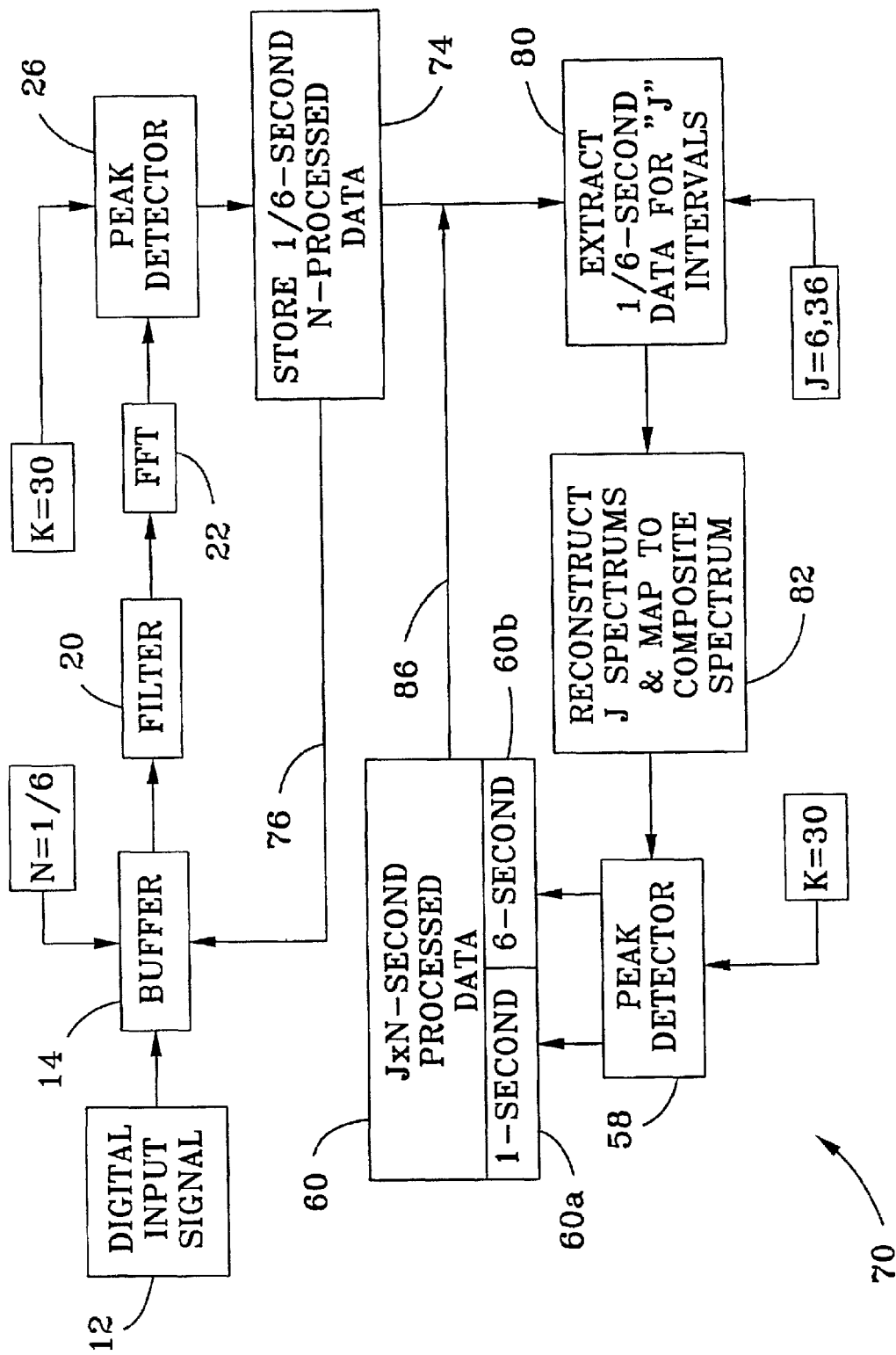
FIG. 3 demonstrates the use of the methods of FIG. 1 and FIG. 2 for narrowband signal processing rates of ⅙, 1, and 6 seconds, with a 12-second length input signal.

FIG. 3 displays an example of the preferred embodiment method 70, incorporating the method 10 of FIG. 1 and the method 40 of FIG. 2. Method 70 provides an example that displays narrowband data and has selectable display refresh rates of one-sixth second, one second, and six seconds. The input signal 12 length is twelve-seconds and N is user-specified as one-sixth-second to provide the first display refresh rate. The input signal 12 is buffered at 14 in one-sixth-second segment intervals for filtering 20 and FFT 22. The resulting DFT 24 corresponding to the one-sixth-second segment is analyzed and the K largest frequencies, powers and bandwidths are stored at 74. For the example of FIG. 3, K is specified as 30. Thus for each one-sixth-second interval, the thirty largest peaks' respective frequencies, powers and bandwidths are stored in a block of memory reserved as one-sixth-second processed data memory. In this example, this correlation between input signal and processing interval is achieved by storing the thirty frequencies, powers and bandwidths for any one-sixth-second interval in contiguous memory locations within the one-sixth-second processed data memory block, such that the previous one-sixth-second interval data precedes the present one-sixth-second interval in memory. The process outlined above repeats, or loops 76 back to the buffer until the full signal length of twelve seconds has been processed. The one-sixth-second data can then be accessed for display.

Also at that time, the one-sixth-second processed data memory contains seventy-two, one-sixth-second intervals (M), or blocks, each block containing thirty frequencies, powers and bandwidths. This one-sixth-second processed data becomes the basis for subsequent display refresh rates. A one-second display refresh rate requires six of the one-sixth-second intervals, thus J=6. The one-sixth-second data is extracted 80 in time-sequential groups comprising six (J) continuous, one-sixth-second intervals. Recall that each of the one-sixth-second data intervals further comprises K, or thirty frequencies, powers and bandwidths. For each group, an individual frequency spectrum is reconstructed for each of the one-sixth-second intervals and the respective six frequency spectrums are mapped to a single composite spectrum 82. The composite spectrum is analyzed and the thirty (K) largest peaks and their respective frequencies, powers and bandwidths are computed at 58 for this one-second interval. The thirty largest frequencies, powers and bandwidths for this one-second interval are then stored at 60 as N×J processed data in unique memory designated as one-second memory (60a). Once the thirty frequencies, powers and bandwidths are stored in the one-second processed data memory, the method returns 86 to extract the next sequential group of J=six, N=one-sixth-second data at 80, until the total signal length of twelve seconds has been processed. As noted above, each interval of each group is individually reconstructed and mapped to a single spectrum 82, and the spectrum of each group is analyzed 58 to obtain and store 60 the thirty frequencies, powers and bandwidths. Thus, for a twelve-second length input signal 12 originally processed at N=one-sixth-second intervals, the one-second, or N×J processed data memory contains only twelve blocks of memory, with each block containing thirty frequencies, powers and bandwidths.

For the six-second display refresh rate, J=thirty-six (i.e., J=(six seconds/one-sixth second)=36), and the N=one-sixth-second processed data is extracted in continuous time period groups of thirty-six one-sixth-second intervals. For each group, J=thirty-six individual spectrums are reconstructed and mapped 82 to a single spectrum, which is analyzed 58 and stored 60 as N×J processed data in unique six-second memory (60b). When the full twelve second signal 12 has been processed, the six-second, or N×J processed data memory contains only two blocks of memory, with each block containing thirty frequencies, powers and bandwidths.

As described previously, the N×J processed data is stored separately for each value of J, with the N processed data being separately stored as well. Thus, depending on the refresh rate selection, the different memory locations are accessed to update the display.

The advantages of the present invention over the prior art are that the processing interval can be increased by integer increments of the initial processing interval, without filter or FFT redesign, or increased computational complexity. By preserving a reduced data set from the initial processing intervals, i.e., the K frequencies, powers and bandwidths, many processing interval variations may be obtained without significant memory requirements or computational delays. Different processing intervals may be accumulated and processed in parallel in real-time, or in a post-processing scenario.

What has thus been described is a method for efficiently computing narrowband signal characteristics with a variable processing interval but fixed system parameters including filter bandwidth and FFT size. Based upon system characteristics including sampling rate, filter bandwidth, FFT size and memory requirements, an input signal is processed in segments of length N. The N-length segments are processed with a filter, a FFT, and a peak detector. The peak detector determines the K largest spectral components, where K is determined by the application, and the corresponding K frequencies, powers and bandwidths are stored to N-processed memory. After sufficient N-length segments are processed and respective data are stored, any increased processing interval data, i.e. an integer increment of N, may be obtained by post-processing the N-processed data. For any new processing interval of (N×J), narrowband signal information is obtained by extracting J sequential sets of the N-processed data, reconstructing J individual frequency spectrums of length N, mapping the J individual spectrums to a composite spectrum, processing the composite spectrum with the peak detector, and outputting and storing the frequencies, powers and bandwidths of the K largest spectral components to unique memory containing the (N×J)-processed data.

Obviously many modifications and variations of the present invention may become apparent in light of the above teachings. For example, more simplified or complex functionality may precede or follow the FFT processing. The filtering, FFT, peak detecting and other functionality may be implemented in hardware or software. The division of the input signal into segments of length N may be performed using buffers, or in combination with the filter. The value of J may be predetermined and therefore the processing may be performed in parallel rather than in series, or continuously rather than at fixed intervals. Processing may occur in real-time, or in a post-processing environment. The variable J may have a single value, or multiple values. Various system components may be combined. The power spectrum computation and peak detection may be performed in a single device, or separate devices. Similarly, the FFT and power spectrum computation may be performed in a single device. The buffering and segmenting may be performed by a single device, or a processor may control the buffer output and segmenting. When the N-processed data is post-processed in intervals of J, the N-processed data may be extracted entirely in J intervals at once, thereby buffering the J intervals and subsequently creating the J individual spectrums before mapping to a composite spectrum; or, the extraction may occur J times without any buffering.

In light of the above, it is therefore understood that within the scope of the appended claims, the invention may be practiced otherwise than as specifically described.

What is claimed is:

1. A method for narrowband digital signal processing, comprising:

dividing the digital signal into time-sequential segments of length N;

determining a positive integer value for K, the value for K representing a number of frequency spectral components required to reconstruct frequency spectral content for a segment of length N;

computing K largest frequency spectral components in each segment; and storing a respective power, frequency and bandwidth for each of the K largest spectral components as N-processed data, the data being time correlated with the respective time-sequential segment.

2. The method of claim 1, wherein computing K largest spectral components in each segment further comprises:

inputting the segment to a Fast Fourier Transform to obtain a frequency domain representation for the segment; and computing a power spectral density from the frequency domain representation for the segment.

3. The method of claim 2, wherein obtaining the frequency domain representation for the segment further comprises computing a Digital Fourier Transform (DFT) of the segment.

4. The method of claim 1 wherein computing and storing the K largest spectral components is performed iteratively for each segment in turn in a time-sequential manner.

5. The method of claim 4 wherein the divided input signal is buffered for iterative access for computing and storing the K largest spectral components of the segment.

6. The method of claim 1 further comprising filtering each segment before computing the K largest spectral components of the segment.

7. A method for narrowband digital signal processing, comprising:

dividing the digital signal into time-sequential segments of length N;

computing K largest frequency spectral components in each segment;

storing a respective power, frequency and bandwidth for each of the K largest spectral components as N-processed data, the data being time correlated with the respective time-sequential segment;

dividing the N-processed data into groups of J time-sequential data sets corresponding to J time-sequential segments;

reconstructing a frequency spectrum for each of the J time-sequential data sets;

mapping each of the J reconstructed spectra for each group to a composite spectrum for each group;

computing K largest spectral components in each of the composite spectrums; and storing a respective power, frequency and bandwidth for each of the K largest spectral components of each of the composite spectrums as (N×J)-processed data, the N×J-processed data being time correlated with the respective time-sequential data sets.

8. The method of claim 7, wherein computing K largest spectral components in each of the composite spectrums further comprises computing a power spectral density from the composite spectrum.

9. The method of claim 7 wherein:

the reconstructing and mapping is performed iteratively for each time-sequential data set within its respective group in turn in a time-sequential manner; and the computing and storing is performed iteratively for each group in turn in a time-sequential manner when all the time-sequential data sets within the respective group have been mapped.

10. The method of claim 7 further comprising filtering each segment before computing the K largest spectral components of the segment.

11. A method for narrowband digital signal processing, comprising:

dividing the digital signal into a series of time-sequential segments of length N;

computing K largest frequency spectral components in a first segment of the series;

storing a power, frequency and bandwidth for the K largest spectral components as N-processed data for the first segment of the series;

iteratively computing the K largest frequency spectral components and storing the N-processed data for the remaining segments of the series;

correlating the N-processed data for all segments of the series in a time-sequential manner;

dividing the N-processed data into time-sequential groups of J time-sequential data sets corresponding to J time-sequential segments;

reconstructing a frequency spectrum for a first J time-sequential data set of a first group;

mapping the reconstructed spectra to a composite spectrum;

iteratively reconstructing the frequency spectrum and mapping the reconstructed spectra to the composite spectrum for the remaining time-sequential data sets of the first group;

correlating all the mapped reconstructed spectra within the composite spectrum in a time-sequential manner corresponding to the time-sequential data sets;

computing K largest spectral components in the correlated composite spectrums;

storing a respective power, frequency and bandwidth for the K largest spectral components of the correlated composite spectrum as (N×J)-processed data;

clearing the correlated composite spectrum;

iteratively obtaining the correlated composite spectrums, computing the K largest spectral components in the composite spectrums, storing the (N×J)-processed data and clearing the composite spectrums for remaining groups of J time-sequential data sets; and correlating the N×J-processed data in a time-sequential manner corresponding to the time-sequential groups.

* * * * *